United States Patent
Susnjara (10) Patent No.: US 12,172,369 B2
(45) Date of Patent: Dec. 24, 2024

(54) METHOD OF PRODUCING PATTERNS, MOLDS, AND RELATED PRODUCTS

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

(21) Appl. No.: 18/325,833

(22) Filed: May 30, 2023

(65) Prior Publication Data

US 2023/0321899 A1 Oct. 12, 2023

Related U.S. Application Data (63) Continuation of application No. 17/661,202, filed on Apr. 28, 2022, now Pat. No. 11,701,818, which is a
(Continued)

(51) Int. Cl.
*B29C 64/147* (2017.01)
*B29C 64/30* (2017.01)
(Continued)

(52) U.S. Cl.
CPC ............ *B29C 64/147* (2017.08); *B29C 64/30* (2017.08); *B33Y 10/00* (2014.12); *B33Y 40/20* (2020.01); *B29K 2101/10* (2013.01)

(58) Field of Classification Search
CPC ..... B29C 64/147; B29C 64/30; B29C 33/301; B33Y 10/00; B33Y 40/20
(Continued)

(56) References Cited

U.S. PATENT DOCUMENTS

| 4,673,453 A | 6/1987 | Georgii |
| 6,119,409 A * | 9/2000 | Makar ................... A42B 1/201 52/79.5 |

(Continued)

FOREIGN PATENT DOCUMENTS

| JP | 2004009727 A | 1/2004 |
| JP | 2006528515 A | 12/2006 |

(Continued)

OTHER PUBLICATIONS

Jacob, A., "Automated Cutting of Composites", Reinforced Plastics, vol. 52, Issue 6, Jun. 2008, pp. 20-23, 25.
(Continued)

*Primary Examiner* — S. Behrooz Ghorishi
*Assistant Examiner* — Gregory C. Grosso
(74) *Attorney, Agent, or Firm* — Bookoff McAndrews, PLLC (57) ABSTRACT

An additive manufacturing method includes removing material from a sheet to create a plurality of individual layer segments formed, placing at least two first layer segments adjacent to each other at the same height to form a first layer having a hollow interior, the at least two first layer segments defining a first portion of an exterior of a part, and placing at least one second layer segment above the at least two first layer segments to form a second layer having a hollow interior, the at least one second layer segment defining a second portion of the exterior of the part. The method includes attaching the first layer to the second layer and removing material from the first layer and from the second layer to form the part having a continuous surface that extends along the first layer and the second layer.

20 Claims, 8 Drawing Sheets

Related U.S. Application Data continuation of application No. 17/322,477, filed on May 17, 2021, now Pat. No. 11,345,081.

(51) Int. Cl.
  *B33Y 10/00* (2015.01)
  *B33Y 40/20* (2020.01)
  *B29K 101/10* (2006.01)

(58) Field of Classification Search
  USPC .......................................................... 156/196
  See application file for complete search history.

(56) References Cited

U.S. PATENT DOCUMENTS

| | | |
|---|---|---|
| 9,451,697 B2 | 9/2016 | Harkness, Jr. et al. |
| 9,550,349 B1 | 1/2017 | Larsen et al. |
| 11,345,081 B1 | 5/2022 | Susnjara |
| 11,701,818 B2* | 7/2023 | Susnjara ............... B29C 64/147 |
| | | 156/196 |
| 2004/0026025 A1 | 2/2004 | Sana et al. |
| 2011/0244213 A1* | 10/2011 | Jones .................... B32B 27/065 |
| | | 156/245 |
| 2012/0153528 A1* | 6/2012 | LaForest ................. C04B 35/83 |
| | | 425/405.1 |
| 2012/0179272 A1 | 7/2012 | Dignam et al. |
| 2015/0064391 A1* | 3/2015 | Trondl .................... B63B 32/57 |
| | | 156/60 |
| 2015/0285083 A1 | 10/2015 | Madsen et al. |
| 2017/0087816 A1 | 3/2017 | Larsen et al. |
| 2018/0056591 A1 | 3/2018 | Harayama et al. |
| 2019/0001656 A1* | 1/2019 | Susnjara ................ B33Y 40/00 |

FOREIGN PATENT DOCUMENTS

| | | |
|---|---|---|
| JP | 2017111397 A | 6/2017 |
| WO | 2019/186593 A1 | 10/2019 |

OTHER PUBLICATIONS

European Search Report issued in European Application No. 22173879.2 on Oct. 17, 2022 (9 pages).
Notice of Reasons for Refusal issued in corresponding application JP 2022-079621, mailed Sep. 5, 2024.
Extended European Search Report issued in corresponding application EP 24186374.5, mailed Oct. 17, 2024.

* cited by examiner

METHOD OF PRODUCING PATTERNS, MOLDS, AND RELATED PRODUCTS

CROSS-REFERENCE TO RELATED APPLICATIONS

This patent application is a continuation of and claims the benefit of priority to U.S. Nonprovisional patent application Ser. No. 17/661,202, filed on Apr. 28, 2022, which is a continuation of and claims the benefit of priority to U.S. Nonprovisional patent application Ser. No. 17/322,477, filed on May 17, 2021, which issued as U.S. Pat. No. 11,345,081, on May 31, 2022, the entireties of which are incorporated herein by reference.

TECHNICAL FIELD

Aspects of the present disclosure relate to apparatus and methods for fabricating components. In some instances, aspects of the present disclosure relate to a method for fabricating components (e.g., patterns, molds, and/or similar products) via techniques or processes similar to 3D printing manufacturing processes of layering, however using lower cost fill materials without the use of a 3D printer.

BACKGROUND

Additive manufacturing techniques and processes involve the buildup of one or more materials to make a net or near net shape (NNS) object, in contrast to subtractive manufacturing methods. Although "additive manufacturing" is an industry standard term (ASTM F2792), additive manufacturing encompasses various manufacturing and prototyping techniques known under a variety of names, including freeform fabrication, 3D printing, rapid prototyping/tooling, etc. Newer additive manufacturing techniques use large-scale 3D printers that are capable of fabricating very large parts, molds, patterns, etc. These items can be produced from fiber-reinforced thermoplastic materials. One method of producing these items utilizes a polymer extruder which generates a bead of molten thermoplastic material which is added to the part being produced one layer at a time. These layers may be modified and or flattened into wider beads during this additive process using devices such as tamping plates, rollers or the like. Using this approach, referred to as 3D printing or additive manufacturing, the part is made slightly larger than the desired final part. After the part cools and hardens, it is machined to the final size and shape. The part, after being machined, can be formed as a shell of a particular thickness, and having a desired size and shape.

While above-described processes may be useful, they can also introduce issues that limit their applicability in certain circumstances. For example, the thermoplastic material can shrink as it cools from printing temperatures to ambient or room temperature. This shrinkage will generally not be the same in every direction and in, at least some cases, should be taken into account when developing the geometry of the printed part, complicating the design and manufacturing processes. Also, since the material as printed is soft and affected by gravity, there is a limit to the maximum angle a wall of the part can be printed. Thus, making a hollow part with a solid top can require either a printed internal support structure, which increases cost, or other types of added support structure for use during printing, which further complicates the manufacturing operation. Also, the materials and equipment commonly used in this process are expensive, limiting the number of suitable applications.

An exemplary fill material used in some thermoplastic additive manufacturing processes is carbon fiber. This material, which can be added to a base polymer, tends to stiffen and strengthen the underlying polymer and also tends to minimize warping that can otherwise occur as the part cools. Carbon fiber however, can be costly and therefore increases the cost of the products produced using this process. This increased cost can limit potential uses to those applications where the value of the piece being produced can justify the cost. Lower cost reinforcement materials, such as wood fiber, may be unsuitable for use with at least some manufacturing devices. For at least some parts or base materials, there can be a maximum amount of fill material that can be added to a base material (e.g., thermoplastic material). If this maximum amount of fill material is exceeded, the resulting changes in the characteristics of the material may adversely affect the ability to process the filled thermoplastic material with additive manufacturing systems, such as 3D printing devices. Even when 3D printing devices or other additive manufacturing systems are able to use highly-filled materials, this equipment can introduce high cost, rendering production of such parts impractical.

SUMMARY

Aspects of the present disclosure relate to, for example, methods and apparatus for fabricating components via layering techniques. Each of the aspects disclosed herein may include one or more of the features described in connection with any of the other disclosed aspects. Some aspects of the present disclosure are useful for processes of creating patterns, molds, and other articles or products using a layering method. In some aspects, this layering method may be comparable to 3D printing or other additive manufacturing methods, while using a technological approach that, in at least some circumstances, can be used with relatively lower cost fill materials. Some aspects of the present disclosure may address issues discussed above, and/or other issues in the art.

In one aspect, an additive manufacturing method may include removing material from a sheet to create a plurality of individual layer segments formed, placing at least two first layer segments adjacent to each other at the same height to form a first layer having a hollow interior, the at least two first layer segments defining a first portion of an exterior of a part, and placing at least one second layer segment above the at least two first layer segments to form a second layer having a hollow interior, the at least one second layer segment defining a second portion of the exterior of the part. The method may include attaching the first layer to the second layer and removing material from the first layer and from the second layer to form the part having a continuous surface that extends along the first layer and the second layer.

In another aspect, a method for manufacturing a part may include removing a porous material from a sheet to create a plurality of individual layer segments, with a CNC router, forming a plurality of layers with the individual layer segments, and securing the layers together to form a part with a shape having a hollow interior. The method may include infusing the porous material of the part with a catalyzed thermoset material that is compatible with the porosity of the porous material by using a vacuum pump, by applying pressure, by dipping the part into the thermoset material, or by spraying the part with the thermoset material and removing material from an exterior of the part, with the CNC router, to form a part having a continuous surface and a hollow interior.

In some aspects, a part is manufactured with a layering process that may facilitate the production of a polymer-based product which has a relatively high quantity of low-cost fill material, particularly in comparison to the polymer content of the product. This process may also involve the use of equipment that is relatively lower cost, particularly when compared to extrusion-based thermoplastic additive manufacturing processes.

In some aspects, the processes and apparatus described herein may employ filler material to produce a part structure. A polymer material may be added to the filler material (or materials) which form the majority of the finished part (e.g., greater than 75%, by volume and/or by weight), as opposed to processes where filler materials are instead added to a polymer that forms the majority of the finished part. For example, this process can include producing a part structure from the filler material itself, and, if necessary, trimming the filler material. This filler material may subsequently be infused with a catalyzed thermoset polymer by supplying thermoset polymer, in liquid form, to the filler material. The thermoset polymer, or other suitable material, may harden after being supplied in liquid form. The hardened filler and polymer composite may impart improved physical properties to the part.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and apparatus for fabricating components via layering techniques. Specifically, the methods and apparatus described herein may be directed to processes of creating patterns, molds, and other parts or products using a layering method.

Figure 1:
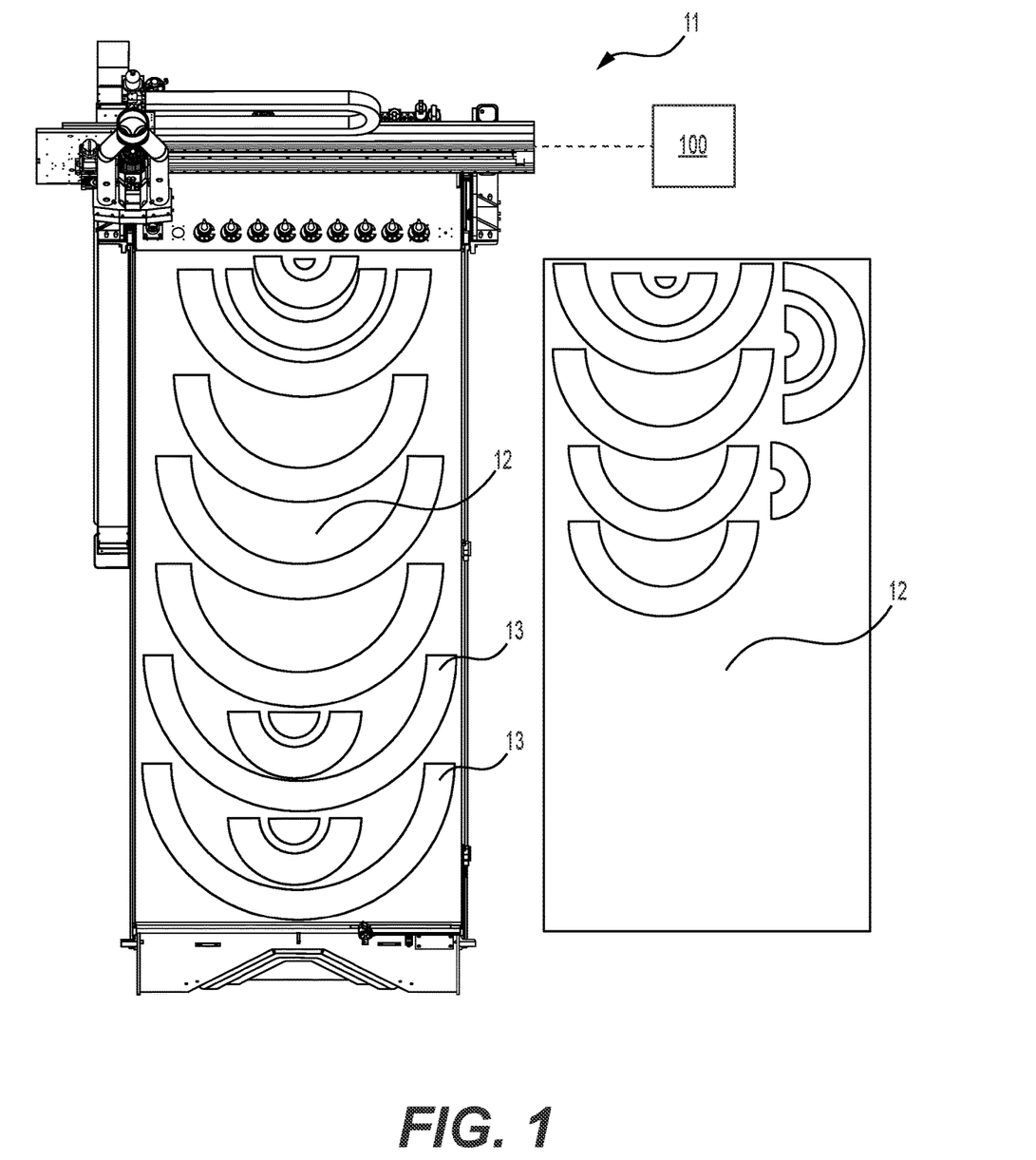
FIG. 1 is a perspective view of an exemplary CNC machine operable to rout layers of filler materials, according to an aspect of the present disclosure.

As shown in FIG. 1, a manufacturing machine, such as a CNC router 11, may be configured to remove material in a controllable manner from a workpiece. CNC router 11 may be part of a manufacturing system including, for example, a control unit or controller 100 configured to generate commands to operate a plurality of servomotors and positon a tool of CNC router 11. CNC router 11 may be operable to remove material from a variety of different materials. For example, CNC router 11 may be configured to position and operate a cutting tool in response to issues generated by controller 100. CNC router 11 may be any suitable machine for modifying a surface of material, including removing material with a cutting tool, such as a 3-axis router (e.g., an apparatus configured the cutting tool with three degrees of freedom), a 5-axis router (e.g., an apparatus configured to position the cutting tool with five degrees of freedom), or an additive manufacturing apparatus having a printing head in addition to a milling head.

An exemplary part manufactured by the process described herein may be formed with an at least partially porous material. An exemplary suitable material may include medium density fiberboard (MDF). Individual portions for the part may include Plexiglas, ultra high molecular weight (UHMW) plastic (e.g., UHMW polyethylene), polyvinyl chloride (PVC), plastic, plywood, drywall, aluminum, instead of or in addition to MDF.

The structure of the part may be formed by assembling a plurality of layers. Each layer may include one or more segments 13. For example, a plurality of layers may be stacked on top of one another to create a desired shape, as described below. In the exemplary configuration illustrated in FIGS. 2-8, the part, when assembled, may have the shape of a hollow cone. The actual geometric shape of a typical part which could be fabricated using this process could vary widely in both shape and size. For clarity, a cone shape is described herein. However, it is expected that parts produced using the methods disclosed herein would be significantly more complex than a simple cone. In this example, each layer may include or consist of a bead of a particular desired thickness and width so that the final structure will resemble structures commonly produced using current thermoplastic additive manufacturing techniques.

A process for manufacturing a part may include producing a plurality of individual pieces or segments 13 that are subsequently assembled to each other. For example, each layer, including a bead of a predetermined or known width, may be formed from segments 13 cut from a sheet 12 of appropriate material, such as MDF, LDF, or rigid plastic foam. As shown in FIG. 1, segments 13 for a single part may be initially formed in a plurality of sheets 12. The cutting or machining of sheet 12 may be performed with a suitable machine, such as a CNC router 11, as shown in FIG. 1. CNC router 11 may split or separate individual segments 13 from each other, with a plurality of these segments 13 belonging to the same layer. In the example shown in FIG. 1, each segment 13 may form an open (e.g., semi-circular or arc-shaped) structure. Additionally or alternatively, one or more segments 13 may be sized and shaped for use to form an entire layer, and thus may for a single closed-loop structure (e.g., a closed circle, ellipse, square, rectangle, irregular shape, etc.). Additionally, as shown in FIG. 1, one or more of the segments 13 may be nested (e.g., positioned within each other), as the final part may be formed with a hollow interior, as described below. Nesting a plurality of segments 13 in a single sheet 12 of material may improve material yield and reduce cost.

Figure 2:
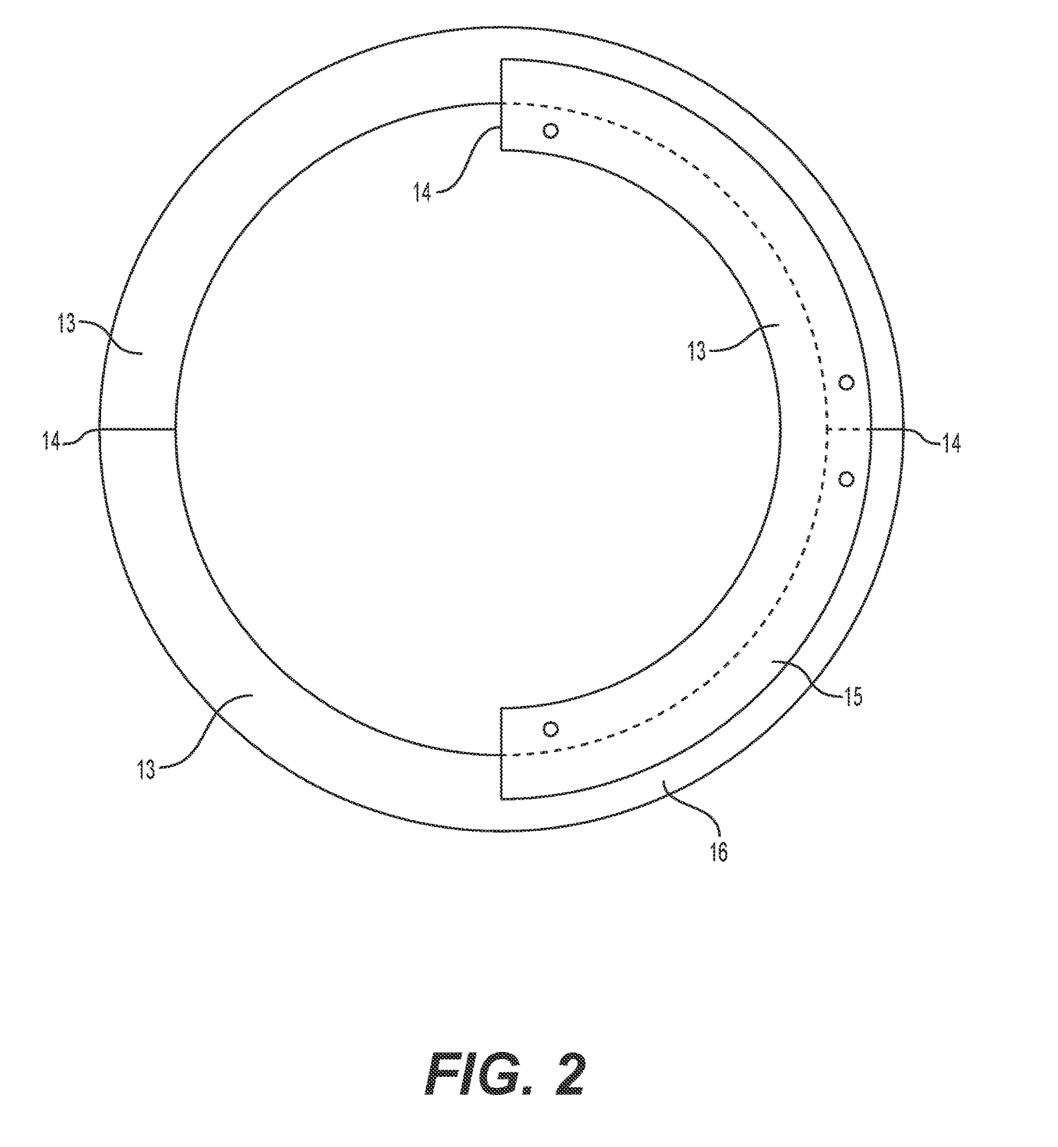
FIG. 2 is a top view of an exemplary bottom or first layer assembled with a portion of a second layer of an exemplary product.

As shown in FIG. 2, a plurality of the individual pieces 13 formed by removing material from sheet 12, may be secured together to form a layer of a part, such as a portion of a cone. A seam or joint 14 may be formed at the interface between a pair of opposing individual segments 13. In the exemplary assembly illustrated in FIG. 2, an upper or second layer 15 including a piece 13 is contiguous with and supported on top of a plurality of pieces 13 of a lower or first layer 16. In some aspects, a joint 14 may be formed by the interface at which individual beads of a single layer butt together. In some aspects, each joint 14 may be offset from joints 14 formed in adjacent layers (layers immediately above and/or immediately below). This offset, or staggering, may improve the strength of the part.

In the exemplary configuration illustrated in FIG. 2, joints 14 in first layer 16 may be circumferentially spaced from each other by 180 degrees, as two arc-shaped segments 13 are assembled together. However, spacings of 120 degrees, 90 degrees, or irregular spacing, depending on the number and shape of segments 13, may also be employed. Each joint 14 of a first layer (e.g., layer 16) may be offset from each joint 14 of a second layer (e.g., layer 15) such that, joints 14 of a given layer do not overlap any joint 14 formed by an adjoining layer. In the example shown in FIG. 2, joints 14 are formed by butt joints between segments 13. Each butt joint 14 of first layer 16 may be offset from one or more butt joints 14 of second layer 15 (a position where a butt joint 14 will be formed with second layer 15 is completed being shown in FIG. 2) by 90 degrees.

Figure 3:
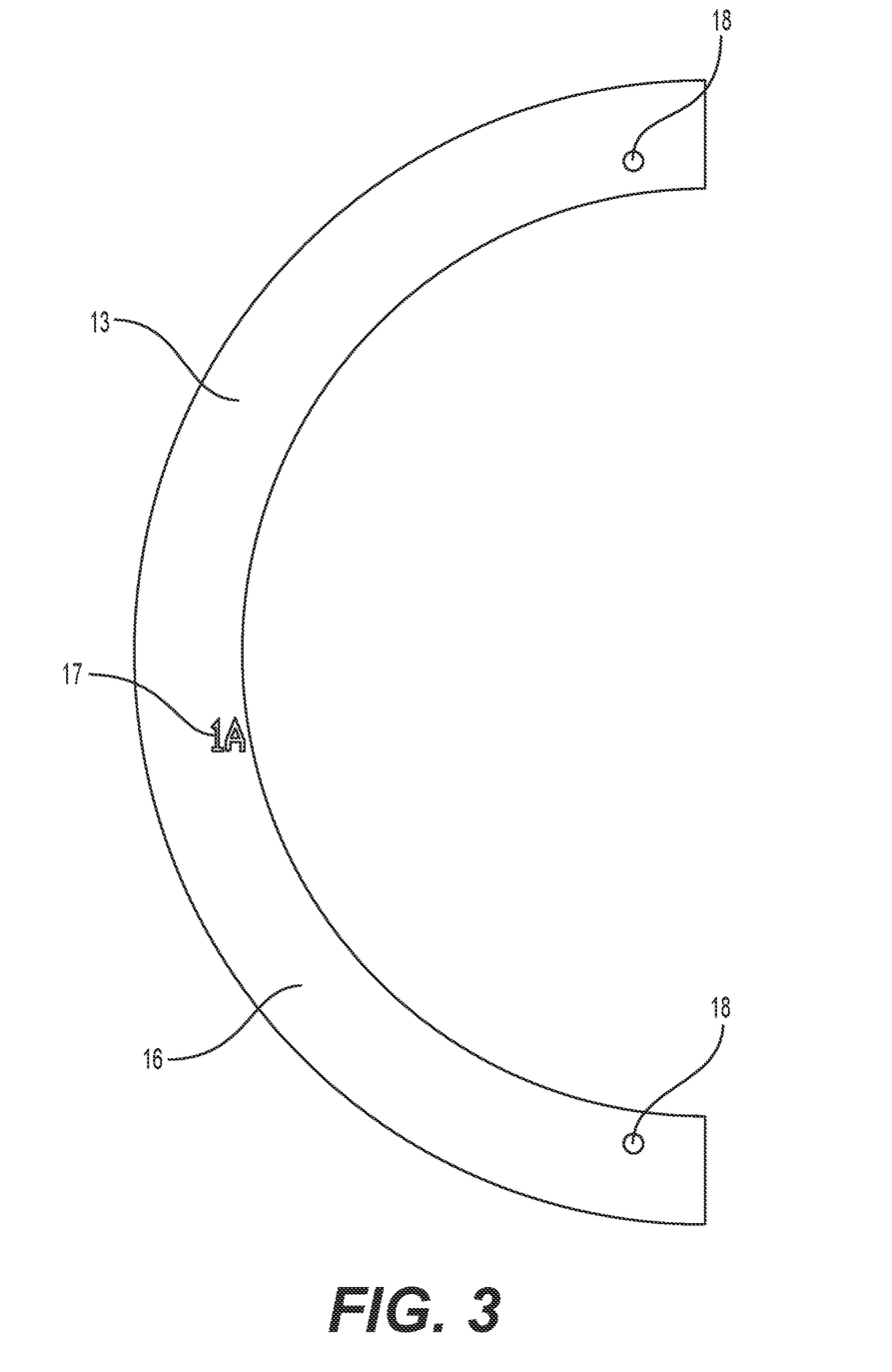
FIG. 3 is a top view of an exemplary portion of a layer of a part, with an identifier (e.g., a number and letter) routed into the material of the portion of the part.

Segments 13 may be employed to manufacture a relatively large structure such that a finalized part, described below, may be larger than CNC router 11. As the formation of large structures may involve the production of a multitude of parts (e.g., segments 13), it may be desirable to facilitate identification and assembly of these segments 13. For example, CNC router 11 or another suitable machining system may etch or otherwise form a mark 17 on a surface of each segment 13. Each mark 17 may be indicative of a layer number (e.g., 1, 2, 3, 4, etc.) and/or location within the particular layer (e.g., A, B, C, left, right, top, bottom, etc.) of the segment 13, as shown in FIG. 3. In some aspects, by removing material from each segment 13 to form a mark 17, it may be possible to identify segments 13 without the need to apply, and subsequently remove, a label that can interfere with assembly.

Figure 4A:
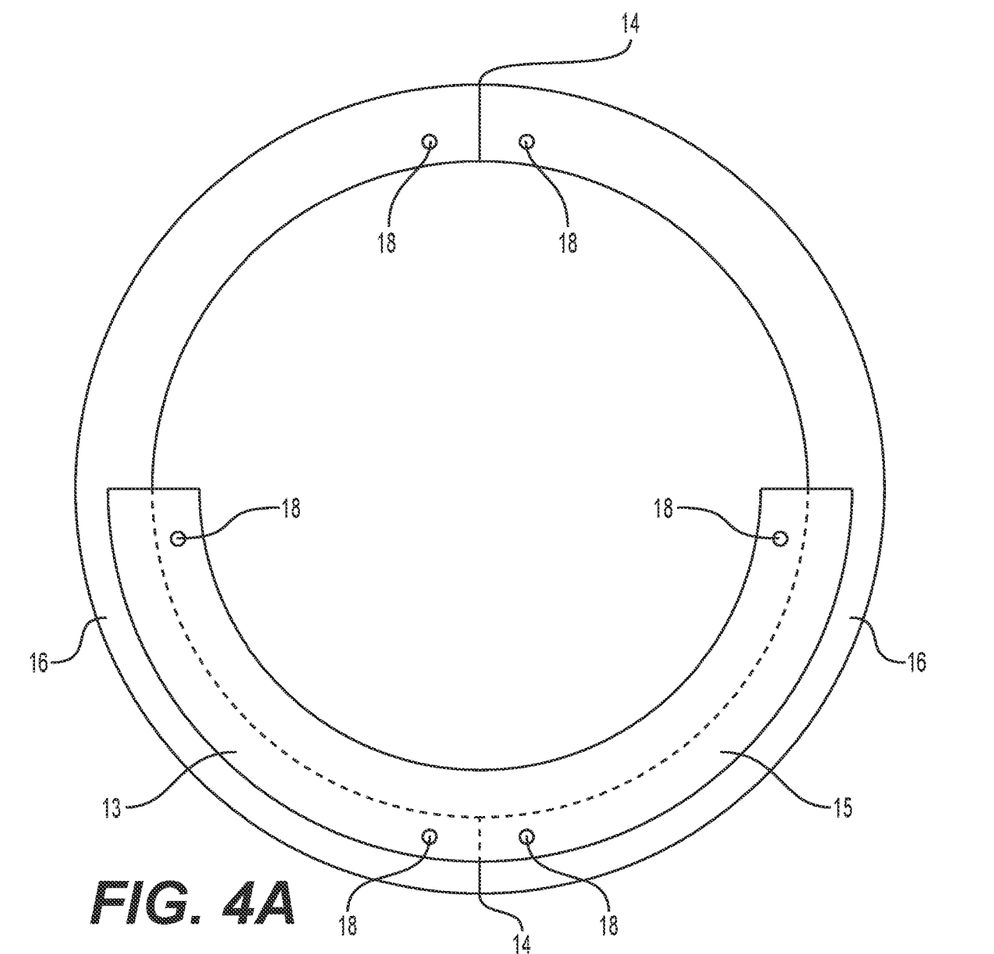
FIG. 4A is a top view of an exemplary second layer assembled and aligned with the first layer.
Figure 4B:
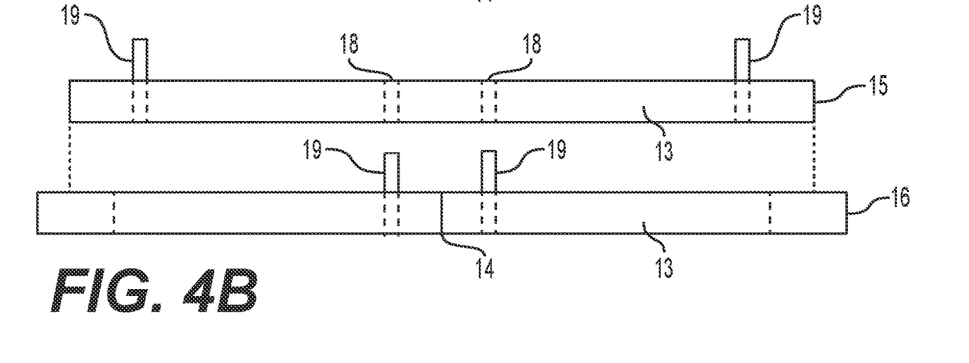
FIG. 4B is an exploded view of the exemplary first and second layers shown in FIG. 4A.

As shown in FIGS. 3, 4A, and 4B, one or more segments 13 may include features configured to facilitate assembly of segments 13 into a near net shape part. For example, dowel holes 18 may be machined or otherwise formed in each layer (e.g., one or more segments 13 of each layer) to facilitate alignment of these layers with respect to each other. As shown in FIG. 4B, each dowel hole 18 may extend through respective upper and lower surfaces of a particular segment 13. Dowel holes 18 may be used to align each layer with the layer above and/or below. Mechanical fasteners, such as dowel pins 19, may be inserted into two or more aligned dowel holes 18, as shown in FIG. 4B. Dowel pins 19 and dowel holes 18 may be configured to facilitate permanent assembly or attachment of a plurality of layers, each layer including one or more segments 13. Each layer may be assembled and permanently attached to one or more other layers using adhesive, bonding agents, mechanical fasteners, or a combination thereof. When mechanical fasteners are used, the layers are not required to be compatible with adhesive bonding techniques. Thus, when mechanical fasteners are used, an entirety of the part may be free of adhesive.

Figure 5A:
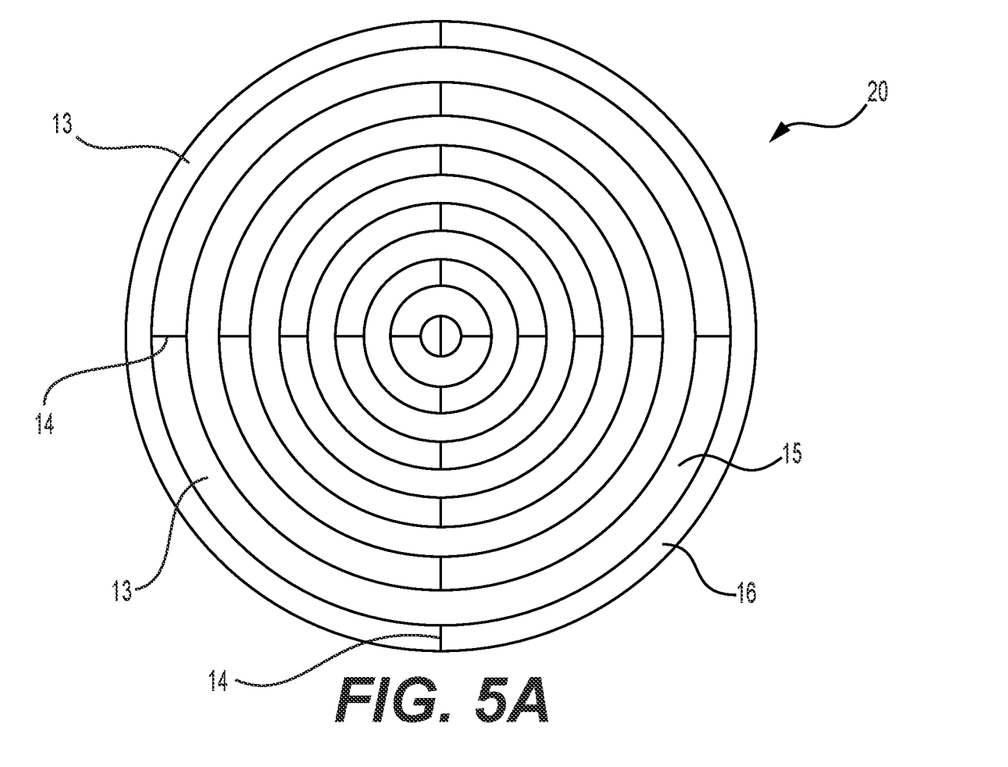
FIG. 5A is a top view of an exemplary near net shape part in a fully assembled state.
Figure 5B:
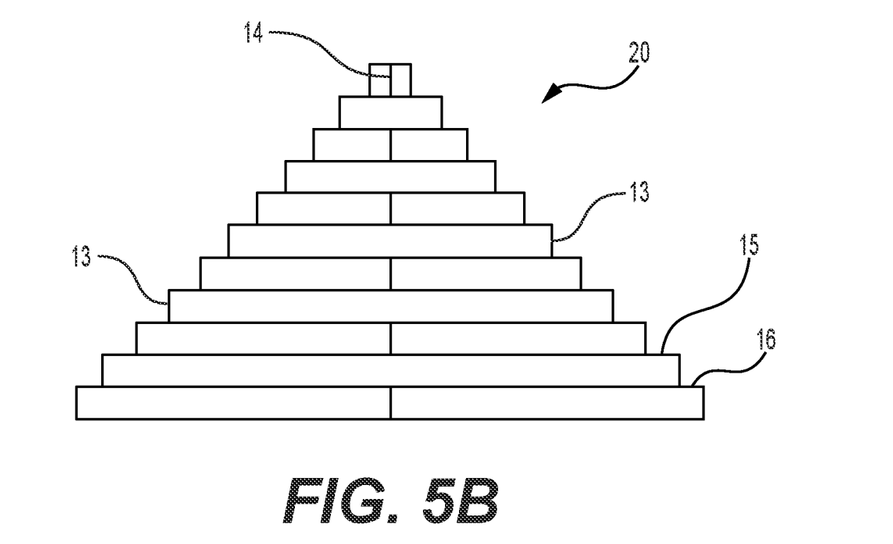
FIG. 5B is a front view of the part shown in FIG. 5A.

FIGS. 5A and 5B illustrate a near net shape part or object 20 when each of the plurality of layers are assembled and attached to each other. Object 20, once assembled, may have a hollow interior formed by the inner radial surfaces of arc-shaped segments 13 (FIGS. 1-4A). An exterior of object 20 may, once assembled, have a stepped shape. Object 20 may, as a whole, may form a conical or frusto-conical shape.

Figure 6A:
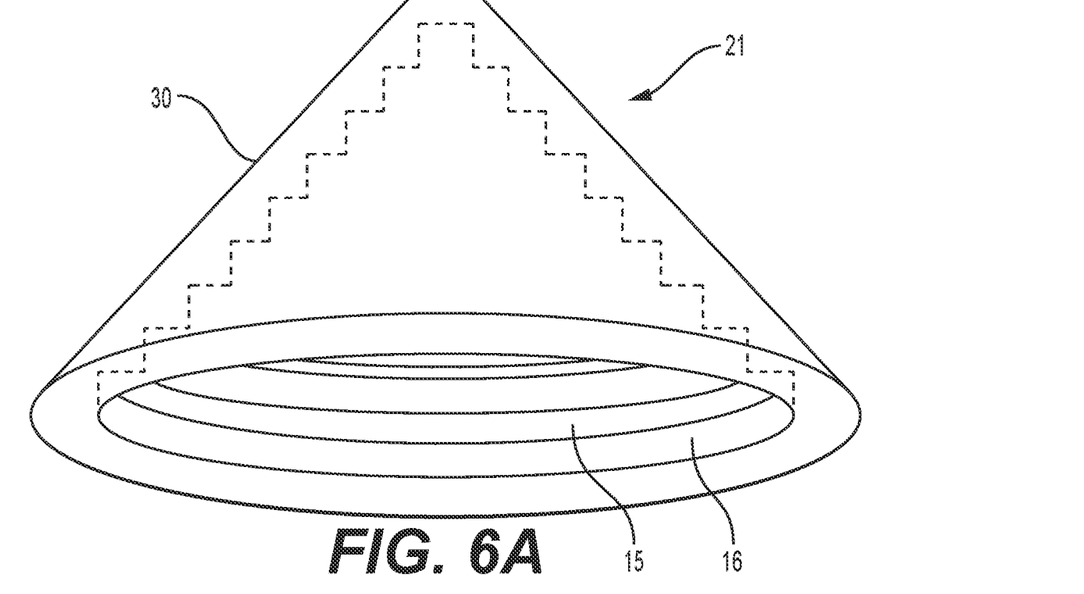
FIG. 6A is a perspective view of an exemplary part after being machined to a desired shape and size.
Figure 6B:
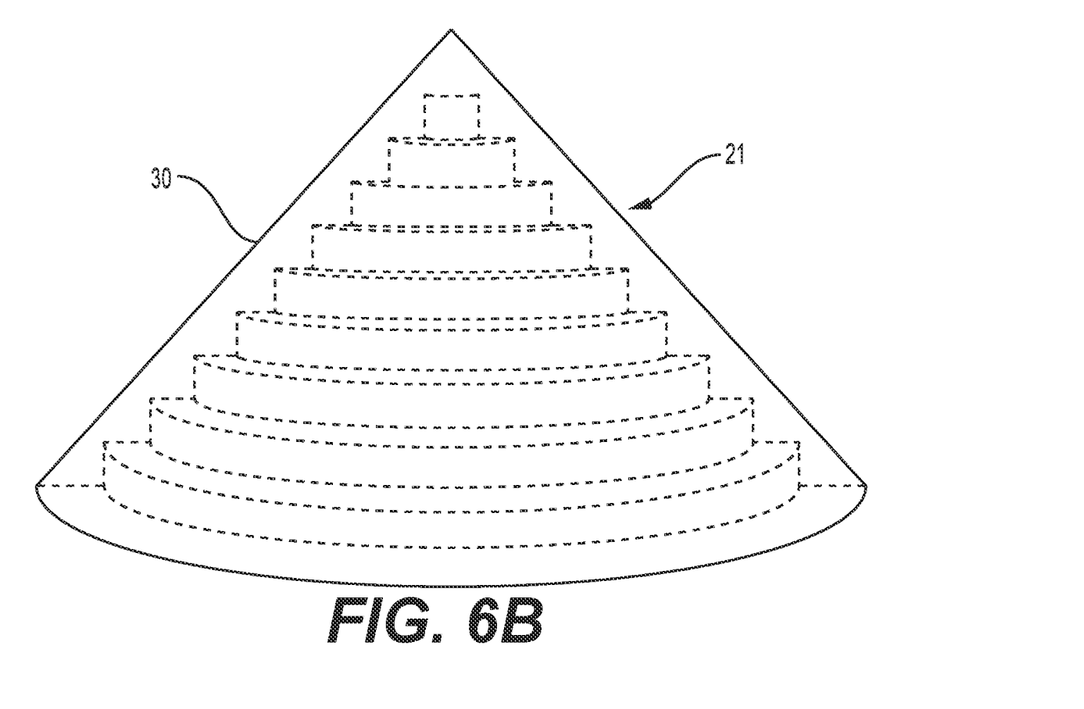
FIG. 6B is a front view of the exemplary part of FIG. 6A.

FIGS. 6A and 6B show an exemplary part or cone mold 21 formed by processing near net shape object 20. Cone mold 21 may be formed by machining an outer surface of part or object 20 to a desired final size and shape, such as cone mold 21. In some aspects, this machining may be performed by a CNC machine, such as router 11. Router 11 may, in response to commands generated by controller 100, remove material from an exterior surface of object 20 so as to form a continuous surface 30 that extends along at least first layer 16 and second layer 15. As shown in FIGS. 6A and 6B, this machined surface 30 may extend from the bottom end of mold 21 to the top end of cone mold 21. As also shown in FIGS. 6A and 6B, an interior of cone mold 21, which is not machined to form a smooth surface, may retain a stepped surface formed by segments 13 of each layer, including layers 15 and 16. Cone mold 21 (or any other part formed by the process described herein) may be larger than CNC router 11. For example, mold 21 may have a height that is larger than a height of CNC router 11, a length larger than a length of CNC router 11, a width larger than a width of CNC 11, or any combination thereof. By forming such a large part with a hollow interior, it may be possible to significantly reduce the amount of material required to make such a part.

Figure 7:
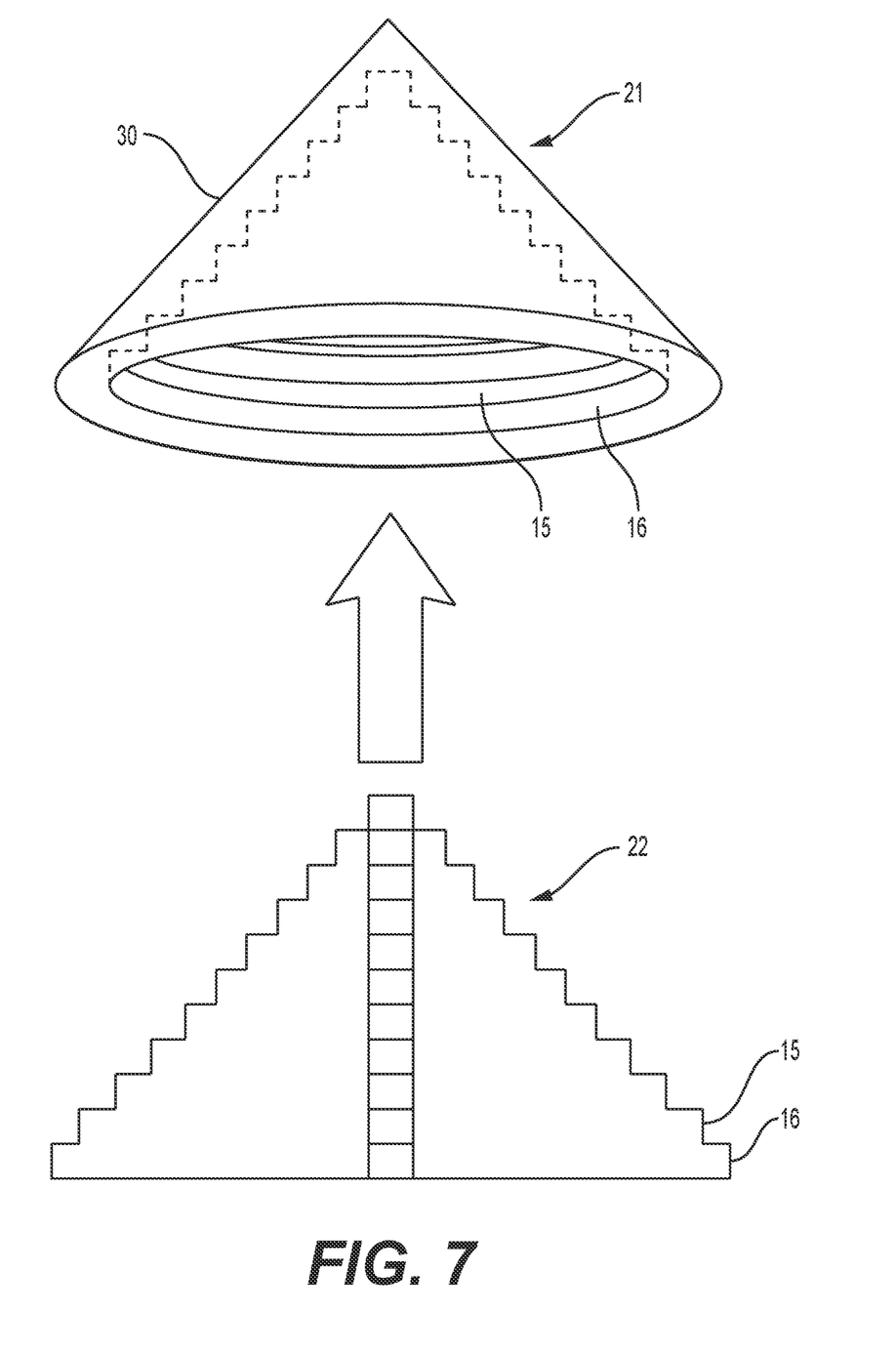
FIG. 7 is a partially-schematic view of an exemplary part and an internal support.

With reference to FIG. 7, a process for manufacturing a part, such as a cone mold 21 or other mold, may include producing and including a support structure, such as support 22. Support 22 may have a shape that at least partially matches a shape of and interior of cone mold 21. Support 22 may, for example, have a stepped exterior shape that matches a stepped shape of the hollow interior of cone mold 21. Each step may correspond to a respective layer of mold 21, such as layers 15 and 16.

One or more internal supports 22 may be added to the interior of cone mold 21 to provide mechanical support to the structure of cone mold 21. This mechanical support may be beneficial during use of mold 21 during a molding process. However, support 22 may be placed within mold 21 prior to the machining of surface 30, if desired. Support 22 may be formed of a suitable material, such as wood. Support 22 may be temporarily or permanently attached to mold 21 using adhesive, bonding agents, mechanical fasteners, or a combination thereof. While a single support 22 may be secured to an interior of mold 21, a plurality of supports 22 may be fabricated and attached to mold 21.

Machined mold 21, with or without support 22, may be suitable for various applications. For example, mold 21, or other structures manufactured according to aspects of the present disclosure, may be used as a mold for forming components with fiberglass. Mold 21 may also be useful as a part for a CNC router, such as a fixture for securing plastic molded parts as they are machined with CNC router 11. Various porous reinforcement materials may be suitable for this approach, such as MDF 12, despite these materials having less strength, durability, and wear resistance as compared to traditional materials. In order to use mold 21 in one or more of the above-described applications, it may be desirable to improve the physical characteristics of mold 21. For example, if a majority (e.g., greater than 50%, greater than 75%, or greater than 90%, by volume and/or by weight)

of the material of mold 21 is a porous material, such as MDF 12, the inherent porosity of the material may be utilized to improve physical properties of the final product.

Figure 8:
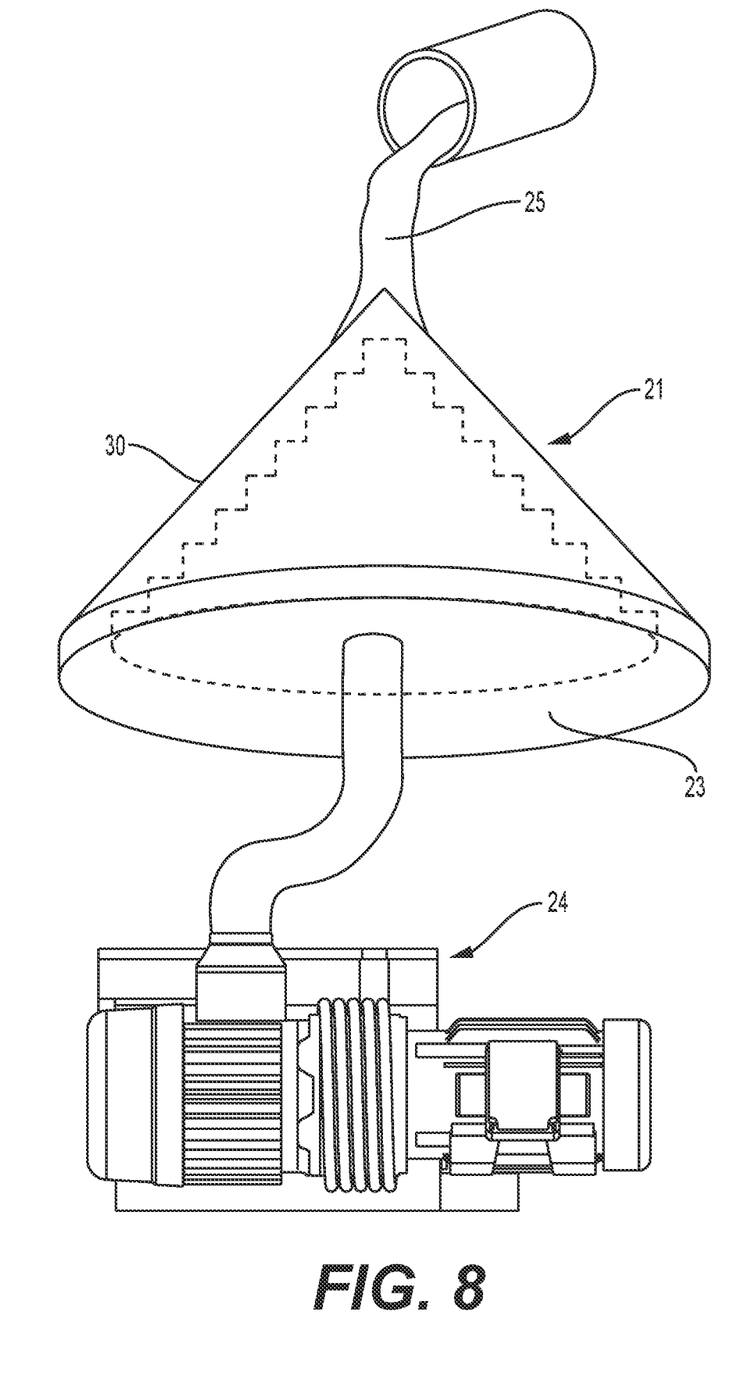
FIG. 8 is a perspective view of a part with a sealed bottom during application of resin.

For example, it may be desirable to apply a reinforcing material to mold 21. A process of manufacturing mold 21 may include performing one or more steps for reinforcing mold 21, including applying a vacuum with the use of a vacuum pump 24 to the inside of the part, as shown in FIG. 8. Other methods for reinforcing mold 21 may include applying pressure to drive reinforcing material (e.g., catalyzed thermoset material) into the mold 21, by dipping the mold 21 into thermoset material, by spraying the mold 21 with thermoset material, etc. When pump 24 is so applied to mold 21 or another part, air may leak through the part, across the entire surface of the part, (e.g., due to the width of the bead or layer used in this process) and when the thickness of the part's outside wall is sufficiently thin.

In order to effectively apply reinforcing material via vacuum 24 to reinforce a part such as mold 21, a base or bottom surface 23 of the part that opposes a narrowed portion or end of mold 21 may be sealed and a high-flow vacuum pump 24 may be connected to part 21 via surface 23. Vacuum pump 24 may be attached to part 21 and used to evacuate air from inside the sealed part 21, as shown in FIG. 8. The volume of air exhausted by the vacuum pump 24 may, in at least some applications, be greater than the volume of air flowing through the surface of the fabricated part so that a level of vacuum, and the resulting air flow through the part surface, can be maintained, despite air leaking through the surface.

With vacuum pump 24 so attached and operated to actively remove air from an interior of mold 21, a thin, low-viscosity catalyzed resin 25, such as epoxy, may be applied to the surface of the part, e.g., surface 30, as shown in FIG. 8. The vacuum applied to the interior of the part and the resulting air flow through the part (e.g., from an outside of the part, through surface 30, to an interior of the part) may pull or draw liquid resin 25 into the structure of the material. As the resin 25 is pulled into the pores of the material, air flow may be gradually reduced in areas where all or nearly all of the thickness has been infused with resin 25. This may have the effect of increasing air flow in areas where the part is not yet fully infused with resin 25. By applying material in these areas, the entire part 21 may eventually become infused with catalyzed resin 25. Once an entirety of part 21 is infused with resin 25, vacuum pump 24 may be deactivated and resin 25 allowed to fully cure and harden. As a result, the strength and physical properties of part 21 may be improved.

In an alternative process, layers of part 21 may be temporarily fastened together with dowel pins 19 or another appropriate method to form a near net shape. Then, a seal may be applied to the bottom surface 23 of part 21. A vacuum may then be applied by vacuum pump 24 to part 21, resulting in an air flow through the part from the outside of the part 21 to an interior of the part. A layer of resin 25 may then be applied to the part 21. As resin 25 is pulled into part 21, resin 25 may gradually seal those areas, causing vacuum to increase in other areas of part 21, pulling resin 25 in to these unsealed areas. Once part 21 has been fully infused in the resin 25 and resin 25 has been allowed to fully cure, resin 25 will have created the bond that holds the layers together permanently. This infusion of resin 25 may occur prior to machining, such as when object 20 has a shape corresponding to FIGS. 5A and 5B. Object 20, once infused with resin 25, may be machined to a desired final size and shape, and used for a wide variety of applications. One exemplary application for a mold 21 formed in this manner may be for use in an autoclave. Autoclave use may be suitable as all layers of mold 21 may be permanently bonded together by resin 25.

As an alternate to using vacuum to infuse resin into the assembled structure, a liquid thermoset material may be used. A suitable liquid thermoset material may be sufficiently thin to penetrate the open pores of the material forming the structure of mold 21 through capillary action wherein the liquid thermoset material soaks into the structure of mold 21. This capillary action may be sufficient to infuse resin without the need for additional force, such as vacuum or pressure.

As an alternate to using vacuum to infuse resin into the assembled structure, it is also possible to use a liquid thermoset material that is thin enough to penetrate the open pores of the particular structure material being utilized through natural capillary action wherein the liquid material soaks into the structure sufficiently without the need for additional external force such as vacuum or pressure.

Different resin 25 formulations may be combined with different substrates (e.g., material of sheets 12) to achieve desired properties. When an object is formed according to one of the above-described embodiments, it may be possible to select a particular resin formulation and/or substrate material to arrive at desired physical properties useful for one or more particular applications of the finished part formed by assembling and modifying this object. The resulting part 21 may be a lower cost, highly filled, polymer part with many desirable properties.

From the foregoing detailed description, it will be evident that there are a number of changes, adaptations and modifications of the present disclosure which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. An additive manufacturing method, comprising:
   removing material from a sheet to create a plurality of individual layer segments;
   placing at least two first layer segments adjacent to each other to form at least a portion of a first layer, the at least a portion of the first layer including a curved section;
   placing at least one second layer segment on the at least two first layer segments to form at least a portion of a second layer;
   forming holes in each of the at least two first layer segments of the first layer;
   forming a plurality of holes in the second layer;
   aligning the holes in each of the at least two first layer segments of the first layer with corresponding holes of the plurality of holes of the second layer, wherein, after the aligning, at least one hole of the plurality of holes in the second layer is radially offset inwards relative to the first layer; and
   securing the first layer to the second layer.

2. The additive manufacturing method of claim 1, wherein the first layer and the second layer partially overlap each other when the holes in the first layer and the second layer are aligned.

3. The additive manufacturing method of claim 1, wherein the first layer has a closed shape.

4. The additive manufacturing method of claim 1, wherein the first layer and the second layer have hollow interiors.

5. The additive manufacturing method of claim 1, wherein the sheet is a porous material.

6. The additive manufacturing method of claim 1, wherein material is removed with a router.

7. The additive manufacturing method of claim 6, wherein the router forms a mark that indicates a layer or a location within a layer for one or more of the layer segments.

8. An additive manufacturing method, comprising:
forming a plurality of individual layer segments with a porous material;
placing at least two first layer segments adjacent to each other to form a first layer, wherein the first layer includes at least two seams;
placing a second layer segment on the at least two first layer segments to form a portion of a second layer, the second layer segment partially overlapping the at least two first layer segments;
forming holes in the first layer and in the second layer;
aligning the holes in the first layer with the holes in the second layer such that the second layer overlaps at least one seam of the at least two seams; and
inserting fasteners through the holes in the first layer and the holes of the second layer, wherein at least one fastener is received by the second layer at a position radially inward of the first layer.

9. The additive manufacturing method of claim 8, wherein placing the at least two first layer segments together creates a joint.

10. The additive manufacturing method of claim 9, wherein the joint is a butt joint.

11. The additive manufacturing method of claim 10, further including applying resin to the at least two first layer segments and the second layer segment after the butt joint has been created.

12. The additive manufacturing method of claim 8, further including removing material from the first layer and from the second layer to form a continuous surface along the first layer and the second layer.

13. An additive manufacturing method, comprising:
forming a plurality of individual layer segments with a porous material;
forming a first layer with at least two first layer segments;
placing at least two second layer segments on the at least two first layer segments to form at least a portion of a second layer, each of the at least two second layer segments of the second layer partially overlapping the at least two first layer segments;
forming holes in the first layer and in the second layer;
aligning the holes in the first layer with the holes in the second layer such that the second layer overlaps at least one seam of at least two seams formed with the first layer;
wherein, after the aligning, at least one hole of the plurality of holes in the second layer is radially offset inwards relative to the first layer; and
applying resin to the first layer and to the second layer, the resin, upon solidifying, permanently bonding the first layer and the second layer.

14. The additive manufacturing method of claim 13, wherein the first layer and the second layer form a portion of a hollow interior of a part.

15. The additive manufacturing method of claim 14, wherein the part is a mold.

16. The additive manufacturing method of claim 15, wherein the hollow interior of the mold is formed with a stepped surface.

17. The additive manufacturing method of claim 13, further including filling pores of the porous material with the resin.

18. The additive manufacturing method of claim 13, wherein the first layer has a closed shape.

19. The additive manufacturing method of claim 13, further including forming a mark that indicates a layer or a location within a layer for one or more of the layer segments.

20. The additive manufacturing method of claim 19, wherein the mark is formed by removing material from the one or more of the layer segments.

\* \* \* \* \*